3,227,523
CHEMICAL ANALYZER
Gerhard J. Hoefker, Omaha, Nebr., and Ted P. Harding, Dallas, Tex.; said Harding assignor to said Hoefker
Filed Jan. 9, 1962, Ser. No. 165,157
2 Claims. (Cl. 23—253)

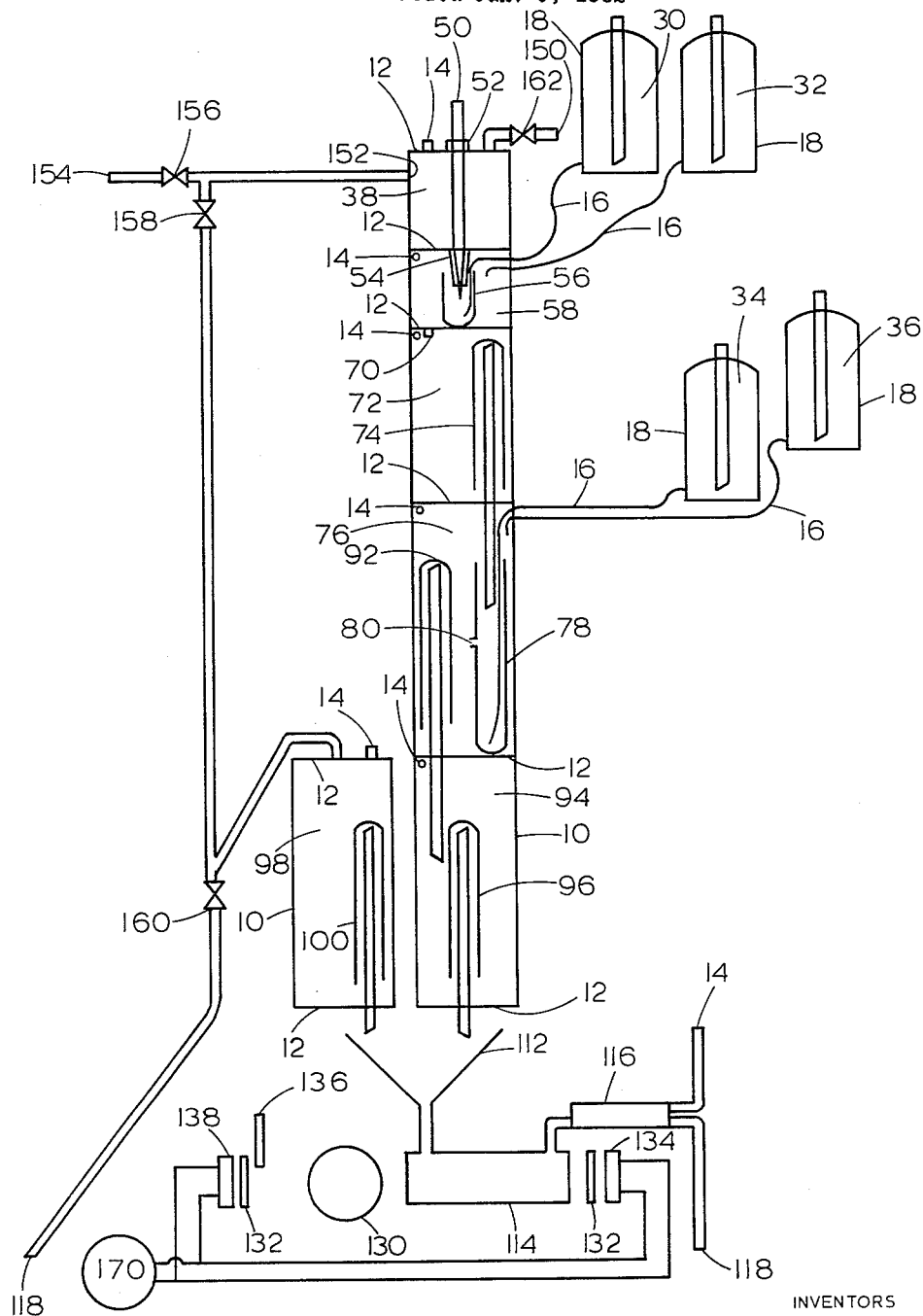

This invention relates to automatic chemical analyzing of liquids and more particularly it is an object of this invention to provide a device that will perform with accuracy and simplicity.

The particular object is to provide a gravity operated colorimetric analyzer measuring color developed from chemical reactions of selected substances in unknown concentrations.

A further and more particular object is to provide a device that will analyze, for example, for silica with the most sensitive colorimetric method known to date using four reagents and which will also measure with other tests using one, two or three reagents as required by the individual test methods.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawing:

The single figure of the drawing shows a diagrammatic representation of the analyzer of this invention.

The following description shows one method that could be used to analyze for silica. Other physical components and arrangements can be used to accommodate more complex or simpler test methods. This device can also be operated in conjunction with timers, recorders, water baths, dialyzers and other devices to perform more complicated and specialized analyzing.

Referring to the drawing, a short and a tall, hollow, preferably cylindrical plastic columns 10 are each segmented by horizontal divider partitions 12 and are each closed at the top except that they are air vented by air vents 14.

A continuous stream of sample enters sample inlet 150 and is throttled by valve 162 and discharged into the constant head sample chamber 38. Overflow passes out overflow port 152, through valve 158, through valve 160 and to the drain 118.

From constant head chamber 38, sample is metered through sample flow orifice 54 by means of flow control rod 50, and its adjustable collar 52.

Sample flows from orifice 54 into first reagent reservoir 56. Also flowing into first reagent reservoir 56 is the number one reagent 30 through a small bore plastic tubing 16.

Reagents are metered by use of constant head bottles 18 and small bore tubing 16. Reagent flow rates are determined by the differential height of the constant head container 18 and the tip end of the small bore plastic tubing 16.

Sample and number one reagent 30 mix and overflow first reagent reservoir 56 where it is mixed with number two reagent 32 in the first mixing chamber 58.

Sample and reagents now flow through drain 70 and discharge into the measuring and second mixing chamber 72. Primary color develops in this chamber 72.

Flow rates of reagents 30 and 32, along with sample flow orifice 54 determines the time it takes to fill the chamber 72 to the level that will prime the first automatic siphon 74. This fixed sample size and adjustable flow rate provides a wide range of applications.

When priming level of siphon 74 has been reached, contents of chamber 72 discharge into second reagent reservoir 78 where the primary color developed sample is mixed with number three reagent 34. Second reagent reservoir 78 has a relief port 80 located on its side and below the level of siphon 74 discharge.

Second reagent reservoir 78 now overflows into the outer part of the third mixing chamber 76 and reacted sample mixes with number four reagent 36. Third mixing chamber 76 continues to fill to the priming level of second automatic siphon 92 which discharges into fourth mixing chamber 94.

The second automatic siphon 92 is sized to prime when the measuring and second mixing chamber 72 discharges. Siphon 92 is positioned to allow a portion of the previous sample to remain for color development and for reagent dilution.

The fourth mixing chamber 94 continues to fill to the priming level of the third automatic siphon 96 whereupon the reacted sample discharges into receptacle 112 and to flow cell 114. Siphon 96 is positioned to allow a portion of the previous sample to remain for color development.

Contents of flow cell 114 are discharged through siphon breaker 116 and to drain 118. Sample amount is sized to adequately flush previous sample from flow cell 114. Reacted sample color is completed in the fixed length flow cell 114 during the accumulation of sample for the next cycle.

Light from lamp 130 energizes measuring photocell 134 through flow cell 114 and filter 132. Light also from lamp 130 energizes reference photocell 138 through filter 132.

With clear or unreacted sample in flow cell 114, photometer circuit can be balanced to zero current flow by use of shutter 136. Using unreacted sample to zero the photometer electrically compensates for natural color in the sample.

When colored (reacted) sample enters flow cell 114, light is absorbed allowing less energy to reach measuring photocell 134. The difference in intensity of light reaching the photocells is shown by indicating meter 170.

The photometer circuit is zeroed by closing valve 160 to fill the zeroing flush chamber 98. Flow cell 114 is flushed when priming level of automatic siphon 100 is reached. Two flushes are recommended. Flush should be accomplished during the interval between regular measuring cycles. Valve 160 is then opened. Shutter 136 is varied to zero the photometer circuit.

Standard solutions or intermittent samples can be fed without overflow loss by closing valves 162 and 158 and opening valve 156, allowing flow through auxiliary sample inlet 154.

It will be seen that a part of the apparatus comprises a standard colorimeter of a sort in common use. The described items which form parts of the standard colorimeter are: the flow cell 114, lamp 130, the filter 132, photo cell 134, photo cell 138, shutter 136, and indicating meter 170.

As thus described, it will be seen that this invention has provided an automatic chemical analyzer which can be simply operated with accuracy and which fulfills the above objects as set forth.

From the foregoing description, it is thought to be obvious that an automatic chemical analyzer constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

We claim:

1. A chemical analyzer comprising: a hollow column, said column having a bottom closure wall, said column having spaced horizontal divider partitions for forming reaction chambers therein, means for providing air vents from the exterior into each of said chambers, an inlet extending from the exterior through said column into a top chamber, a top chamber overflow port through said column and spaced from the bottom of said top chamber whereby said top chamber functions as a constant head chamber, sample flow means connecting the top two chambers, a first reagent reservoir disposed in the chamber below said constant head chamber in a position for receiving flow of sample from said sample flow means, means for conducting flow of a number one reagent to first reagent reservoir, said first reagent reservoir having an open top for permitting overflow into the chamber below said constant head chamber which former is called the first mixing chamber, a drain port through the partition wall at the bottom of said first mixing chamber into the chamber below which latter is the second mixing chamber in which primary color develops, means for conducting a second reagent source previously recited to said first mixing chamber, said means for conducting flow of said reagents providing constant selected flow rates, a first automatic siphon disposed in the second mixing chamber, means for conducting fluid from said first automatic siphon disposed in the second mixing chamber, means for conducting fluid from said first automatic siphon to the chamber below said second mixing chamber when said first automatic siphon is primed, the said chamber beneath the said second mixing chamber being called a third mixing chamber, a second reagent reservoir disposed in said third mixing chamber in a position for receiving flow from said first automatic siphon, said second reagent reservoir having a relief port in communication with said third mixing chamber and disposed below the level of discharge of said means conducting flow from said first siphon to said second reagent reservoir, a second automatic siphon disposed in said third mixing chamber, said second automatic siphon being sized to prime when the second mixing chamber discharges whereby the second mixing chamber serves the purposes of measuring, a receptacle, a flow cell in communication with said receptacle, means for conducting flow from said second automatic siphon to said receptacle, a siphon breaker operatively connected with said flow cell and a dual beam colorimeter of which said flow cell is a portion.

2. A chemical analyzer comprising: means forming three chambers called a top chamber, a mixing chamber and a siphon chamber for color development, said mixing chamber being below said top chamber, said siphon chamber being below said mixing chamber, means in said top chamber for providing constant flow of sample from said top chamber to said mixing chamber, means for conducting a constant flow of reagent to said mixing chamber, means for providing air vents from the exterior of each chamber into each chamber, means for conducting fluid flow from said mixing chamber to said siphon chamber, an automatic siphon disposed in said siphon chamber, means for conducting reacted sample fluid from said siphon outwardly of said siphon chamber when said siphon is primed to make room for sequential samples to enter said siphon chamber so that sequential samples can be analyzed.

References Cited by the Examiner
UNITED STATES PATENTS

| | | | |
|---|---|---|---|
| 2,202,346 | 5/1940 | King | 23—253 |
| 2,342,366 | 2/1944 | Podbielniak | 23—253 |
| 2,408,900 | 10/1946 | Alston et al. | 23—253 |
| 2,680,060 | 6/1954 | Natelson | 23—253 |
| 2,901,327 | 8/1959 | Thayer et al. | 23—230 |

FOREIGN PATENTS 793,792   4/1958   Great Britain.

MORRIS O. WOLK, *Primary Examiner.*
ANTHONY SCIAMANNA, *Examiner.*